United States Patent
Simmons et al.

(10) Patent No.: US 7,105,047 B2
(45) Date of Patent: Sep. 12, 2006

(54) THERMAL PROTECTIVE COATING

(75) Inventors: Jason Andrew Simmons, Blacksburg, VA (US); Timothy G. Evans, Blacksburg, VA (US); Rex Allen Churchward, Flaorianopolis (BR); John G. Dillard, New Castle, VA (US); John W. Olver, Blacksburg, VA (US)

(73) Assignee: Wessex Incorporated, Blacksburg, VA (US)

( * ) Notice: Subject to any disclaimer, the term of this patent is extended or adjusted under 35 U.S.C. 154(b) by 234 days.

(21) Appl. No.: 10/430,657

(22) Filed: May 6, 2003

(65) Prior Publication Data

US 2006/0156958 A1    Jul. 20, 2006

(51) Int. Cl.
*C09D 1/02* (2006.01)
*C04B 14/00* (2006.01)
*B32B 13/00* (2006.01)
*B05D 3/02* (2006.01)

(52) U.S. Cl. .............. 106/600; 106/612; 106/626; 106/628; 106/632; 106/635; 106/792; 106/793; 106/799; 106/801; 428/688; 428/689; 428/697; 428/703; 428/397.8

(58) Field of Classification Search ............... 106/600, 106/612, 626, 628, 632, 635, 792–793, 799, 106/801; 428/688–689, 697–698, 703; 427/397.8
See application file for complete search history.

(56) References Cited

U.S. PATENT DOCUMENTS

| 4,072,530 | A |   | 2/1978  | Hirame et al. |
| 4,469,721 | A | * | 9/1984  | Shioya ................... 427/397.8 |
| 4,810,300 | A |   | 3/1989  | Holcombe, Jr. et al. |
| 5,066,330 | A | * | 11/1991 | Holcombe et al. ..... 106/287.34 |
| 5,296,288 | A |   | 3/1994  | Kourtides et al. |
| 5,468,290 | A | * | 11/1995 | Kelley ........................ 106/635 |
| 5,569,427 | A |   | 10/1996 | Semenova et al. |
| 5,668,072 | A |   | 9/1997  | Holcombe, Jr. et al. |
| 6,007,873 | A |   | 12/1999 | Holcombe, Jr. et al. |
| 6,444,271 | B1 |  | 9/2002  | Wittenauer et al. |
| 6,589,661 | B1 | * | 7/2003  | Neely, Jr. ................. 427/397.8 |
| 6,921,431 | B1 | * | 7/2005  | Evans et al. ........... 106/287.34 |

* cited by examiner

*Primary Examiner*—Helene Klemanski
(74) *Attorney, Agent, or Firm*—Mary-Jacq Holroyd; Johnston Holroyd

(57) ABSTRACT

A coating, method of coating and substrates coated thereby, wherein the coating contains an inorganic adhesive such as an alkali/alkaline earth metal silicate such as sodium silicate, potassium silicate, calcium silicate, and magnesium silicate; a filler such as a metal oxide for example silicon dioxide, aluminum oxide, titanium dioxide, magnesium oxide, calcium oxide and boron oxide; and one or more emissivity agents such as silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, chromium oxides and copper chromium oxides, and derivatives thereof. In a coating solution, an admixture of the coating contains water. A stabilizer such as bentonite, kaolin, magnesium alumina silicon clay, tabular alumina and stabilized zirconium oxide may be added.

40 Claims, No Drawings

THERMAL PROTECTIVE COATING

FIELD OF THE INVENTION

The present invention relates to a protective coating for use on a substrate, and more particularly to a thermal protective coating, and substrates coated therewith, which coating provides excellent resistance to high temperatures and repeated thermal shock at elevated temperatures.

BACKGROUND OF THE INVENTION

Protective coatings for use on numerous substrates are known in the prior art. For example, U.S. Pat. No. 5,296, 288, the contents of which are incorporated herein by reference in its entirety, issued on Mar. 22, 1994 describes a protective coating for ceramic materials and a thermal control structure comprising a ceramic material having the protective coating thereon. The protective coating includes, in admixture, silicon dioxide powder, colloidal silicon dioxide, water and one or more emittance agent selected from the group consisting of silicon tetraboride, silicon hexaboride, silicon carbide, molybdenum disilicide, tungsten disilicide, and zirconium diboride. The invention therein has the drawback that the coating must be used immediately after the composition is prepared.

Prior efforts have been made to generate protective coatings having high emissivity characteristics for use on metal surfaces. U.S. Pat. No. 5,668,072 ('072) and U.S. Pat. No. 6,007,873 ('873) issued respectively on Sep. 16, 1997 and Dec. 28, 1999 teaches a high emissivity coating composition, and methods of use for coating the interior of furnaces, in which the coating composition includes a high emissivity agent such as a rare earth oxide and a binder agent. The preferred emissivity agent is cerium oxide or related agents including mixed oxides of cerium oxide and precursors. Terbium may be substituted for cerium. The binder, which also is used as a suspension agent, includes an aluminum phosphate solution, peptized aluminum oxide monohydrate and ethyl alcohol. The invention of '873 makes use of organic substances potentially increasing the amount of fumes generated during heating.

U.S. Pat. No. 4,810,300 ('300) issued on Mar. 7, 1989 discloses a composition to produce an adherent and water insoluble deposit on substrate surfaces, which deposit is used for inks, paints and the like. The coating material for the substrate surfaces includes at least water, a pre-reacted lithium silicate and an unreacted lithium hydroxide monohydrate. Preferably, the liquid phase contains a dispersant in the form of clay. A suitable pigment or other refractory material such as graphite, oxides, borides, nitrides, carbides, sulfides, metals and mixtures thereof may also be incorporated therein. The effective temperature range of the coating material is up to about 2000° C. The '300 invention adheres to metal surfaces but does not provide thermal protection to the underlying surface.

U.S. Pat. No. 5,569,427 ('427) issued on Oct. 29, 1996 describes a high temperature coating for use on a ceramic substrate and a non-firing process for obtaining the high temperature coating. The coating comprises a silica from a silica sol, an alumina, a silicon carbide and a molybdenum disilicide. The coating has an operating temperature up to 1500° C. The coating of '427 is used immediately after being prepared, and is formulated for ceramic substrate surfaces.

U.S. Pat. No. 6,444,271 ('271) issued on Sep. 3, 2002 discloses a durable refractory ceramic coating having a silicide coating comprising a refractory metal and silicon, which combines to form a silicide. The coating described therein is at least partially diffused into the base structure of at least one surface. The base structure is a ceramic material, which is preferably a ceramic oxide material. The invention of '271 uses a polymeric stock solution for a carrier to apply the coating thereby potentially increasing the flammable nature of the stock solution.

It is also known to use bentonite in heat resistant coatings. U.S. Pat. No. 4,072,530 issued on Feb. 7, 1978 teaches a refractory furnace wall coating composition containing silicon carbide, a stabilized zirconium oxide or bentonite, a silicon dioxide, a hydrolyzate of poly(ethyl silicate), a sodium silicate or aluminum phosphate and water.

None of the above inventions and patents, taken either singularly or in combination, is seen to describe the instant invention as claimed.

SUMMARY OF THE INVENTION

The present invention relates to a thermal protective coating which contains an inorganic adhesive such as an alkali/alkaline earth metal silicate taken from the group consisting of sodium silicate, potassium silicate, calcium silicate, and magnesium silicate, a filler such as a metal oxide taken from the group consisting of silicon dioxide, aluminum oxide, titanium dioxide, magnesium oxide, calcium oxide and boron oxide, and one or more emissivity agents. The emissivity agents can be silicon hexaboride, carbon tetraboride, silicon tetraboride, silicon carbide, molybdenum disilicide, tungsten disilicide, zirconium diboride, cupric chromite, or metallic oxides such as iron oxides, magnesium oxides, manganese oxides, copper chromium oxides and other chromium oxides, and derivatives thereof. Preferably, a stabilizer is added such as bentonite, kaolin, magnesium alumina silica clay, tabular alumina or stabilized zirconium oxide. In a coating solution according to the present invention, an admixture of the thermal protective coating contains an inorganic adhesive, a filler, one or more emissivity agents, and water. In order to extend the shelf life of the coating solution, a stabilizer is preferably added. A colorant may be added to form a thermal protective paint.

The present invention may be used to coat metals, particularly alloys of steel and aluminum thereby allowing the re-radiation of heat up to at least 5000° F. depending upon the substrate coated and the level of thermal protection desired. These coatings are capable of sustaining repeated thermal shock. The coatings have emissivity agents and other compounds that constitute an amorphous thermal protective system that has many potential uses. Surface temperature differences between coated and uncoated samples may range between 650° F. and 750° F. with back face versus front face temperatures of coated samples ranging between 1000° F. and 1100° F.

An aspect of the present invention is to provide a thermal protective coating that has an extended shelf life. The addition of a stabilizer permits a coating solution, according to the present invention, to be prepared and used at a later date.

Another aspect of the present invention is to provide a thermal protective coating that improves the optical properties and thermal stability of substrate materials at temperatures substantially higher than the substrate materials melting point or thermal dissociation point. This protection permits the substrate material's exposure to higher thermal conditions than would normally be permitted by the uncoated substrate thereby extending the substrate materials useful range of thermal conditions.

A related aspect of the present invention is to limit flashover. By utilizing the principle of emissivity, the thermal protective coating of the present invention reduces heat transfer to the underlying material. Without this feature, the thermal protective coating might prevent flame spread, but the underlying material would become so hot, it could combust or melt due to the high temperature alone, a phenomenon called "flashover". The thermal protective coating of the present invention prevents the underlying material both from flame degradation and from temperatures beyond the material's temperature range, and helps avoid flashover.

The thermal protective coating of the present invention decreases the catalytic efficiency of the surface. In addition, the thermal protective coating has extremely low thermal conductance; therefore, the remaining heat that is not reflected back out is conducted to the surrounding area very slowly. This aspect of the present invention provides fire protection for diverse coated substrates including steel and aluminum catalytic converters, exhaust systems, aircraft passenger compartments and interiors, furnaces, office buildings and homes, and the like.

Furthermore, another aspect of the present invention is that it is able to increase performance temperatures for all kinds of metals, including, but not limited to, iron, steel, cast iron, and aluminum and alloys thereof. Furthermore, the present invention allows increased abrasion and corrosion resistance on the surface of abrasion prone metallic structures, including planes and other aerospace applications, boats, and automobiles.

Another aspect of the present invention is to provide a thermal protective coating that does not produce toxic fumes when heated. A thermal protective coating according the present invention is 99% inorganic, and therefore produces only minute amounts of smoke from the organics-based components. Many flame-retardant products contain large quantities of organic materials, which produce smoke under flame and can be toxic in enclosed spaces.

Yet another aspect of the present invention is to provide a thermal protective coating that does not significantly increase the weight of the coated substrate.

These and other objects of the present invention will become readily apparent upon further review of the following specification.

DETAILED DESCRIPTION OF PREFERRED EMBODIMENTS

The present invention relates to a thermal protective coating, which contains from about 5% to about 30% of an inorganic adhesive, from about 45% to about 92% of a filler, and from about 2% to about 20% of one or more emissivity agents, in a dry admixture. Preferably, the dry admixture also contains from about 1% to about 5% of a stabilizer. In a coating solution according to the present invention, a wet admixture of the thermal protective coating contains from about 6% to about 40% of an inorganic adhesive, from about 23% to about 46% of a filler, from about 1% to about 10% of one or more emissivity agents, and from about 18% to about 50% water. In order to extend the shelf life of the coating solution, from about 0.5% to about 2.5% of a stabilizer is preferably added to the wet admixture. The wet admixture coating solution contains between about 40% and about 60% total solids.

As used herein, all percentages (%) are percent weight-to-weight, also expressed as weight/weight %, % (w/w), w/w, w/w % or simply %, unless otherwise indicated. Also, as used herein, the terms "wet admixture" refers to relative percentages of the composition of the thermal protective coating in solution and "dry admixture" refers to the relative percentages of the composition of the dry thermal protective coating mixture prior to the addition of water. In other words, the dry admixture percentages are those present without taking water into account. Wet admixture refers to the admixture in solution (with water). "Wet weight percentage" is the weight in a wet admixture, and "dry weight percentage" is the weight in a dry admixture without regard to the wet weight percentages.

The inorganic adhesive is preferably an alkali/alkaline earth metal silicate taken from the group consisting of sodium silicate, potassium silicate, calcium silicate, and magnesium silicate. The filler is preferably a metal oxide taken from the group consisting of silicon dioxide, aluminum oxide, titanium dioxide, magnesium oxide, calcium oxide and boron oxide. The emissivity agent(s) is preferably taken from the group consisting of silicon hexaboride, carbon tetraboride, silicon tetraboride, silicon carbide, molybdenum disilicide, tungsten disilicide, zirconium diboride, cupric chromite, and metallic oxides such as iron oxides, magnesium oxides, manganese oxides, copper chromium oxides, and chromium oxides, and derivatives thereof. The copper chromium oxide, as used in the present invention, is a mixture of cupric chromite and cupric oxide. The stabilizer may be taken from the group consisting of bentonite, kaolin, magnesium alumina silica clay, tabular alumina and stabilized zirconium oxide. The stabilizer is preferably bentonite. Other ball clay stabilizers may be substituted herein as a stabilizer.

Coloring may be added to the protective coating of the present invention to form a flame retardant paint. Inorganic pigments may be added to the protective coating to form a flame retardant paint without generating toxic fumes. In general, inorganic pigments are divided into the subclasses: colored (salts and oxides), blacks, white and metallic. Suitable inorganic pigments include but are not limited to yellow cadmium, orange cadmium, red cadmium, deep orange cadmium, orange cadmium lithopone and red cadmium lithopone.

A preferred embodiment of the present invention contains a dry admixture of from about 10% to about 25% sodium silicate, from about 50% to about 79% silicon dioxide powder, and from about 4% to about 15% of one or more emittance agent(s) taken from the group consisting of iron oxide, boron silicide, boron carbide, silicon tetraboride, silicon carbide molybdenum disilicide, tungsten disilicide, zirconium diboride. Preferred embodiments of the thermal coating may contain from about 1.0% to about 5.0% bentonite powder in dry admixture. The corresponding coating in solution (wet admixture) for this embodiment contains from about 20.0% to about 35.0% sodium silicate, from about 25.0% to about 50.0% silicon dioxide, from about 18.0% to about 39.0% water, and from about 2.0% to about 7.5% one or more emittance agent(s). This wet admixture must be used immediately. In order to provide a coating solution admixture (wet admixture), which may be stored and used later, preferred embodiments of the thermal coating contain from about 0.50% to about 2.50% bentonite powder. Preferably deionized water is used. Preferred embodiments of the wet admixture have a total solids content ranging from about 45% to about 55%.

A preferred thermal protective coating of the present invention contains a dry admixture from about 15.0% to about 20% sodium silicate, from about 69.0% to about 79.0% silicon dioxide powder, about 1.00% bentonite powder, and from about 5.00% to about 15.0% of an emittance agent. The emittance agent is taken from one or more of the following: iron oxide, boron silicide, and boron carbide.

A most preferred wet admixture contains about 20.0% sodium silicate based on a sodium silicate solids content of about 37.45%, from about 34.5% to about 39.5% silicon dioxide powder, about 0.500% bentonite powder, and from about 2.50% to about 7.5% of an emittance agent, with the balance being water. The emittance agent is most preferably taken from the group consisting of iron oxide, boron silicide, and boron carbide (also known as, carbon tetraboride). Preferred embodiments include those where the emittance agent comprises about 2.50% iron oxide, about 2.50% boron silicide, or from about 2.50% to about 7.50% boron carbide. The pH of a most preferred wet admixture according to the present invention is about 11.2±1.0, the specific gravity is about 1.45±0.05 and the total solids content is about 50±0.3%.

An inorganic adhesive, which may be used in the present invention, includes N (trademark) type sodium silicate that is available from the PQ Corporation (of Valley Forge, Pa.). Sodium silicate, also known as waterglass, is a versatile, inorganic chemical made by combining various ratios of sand and soda ash (sodium carbonate) at high temperature. Sodium silicates ($Na_2O \cdot XSiO_2$) are metal oxides of silica. All soluble silicates can be differentiated by their ratio, defined as the weight proportion of silica to alkali ($SiO_2/Na_2O$). Ratio determines the physical and chemical properties of the coating. The glassy nature of silicates imparts strong and rigid physical properties to dried films or coatings. Silicates air dry to a specific moisture level, according to ambient temperature and relative humidity. Heating is necessary to take these films to complete dryness—a condition in which silicates become nearly insoluble. Reaction with other materials, such as aluminum or calcium compounds, will make the film coating completely insoluble. The N (trademark) type sodium silicate, as used in the examples below, has a weight ratio $SiO_2/Na_2O$ is 3.22, 8.9% $Na_2O$, 28.7% $SiO_2$, with a density (at room temperature of 20° C.) of 41.0° Be', 11.6 lb/gal or 1.38 g/cm³. The pH is 11.3 with a viscosity of 180 centipoises. The N type sodium silicate is in a state of a syrupy liquid.

The term "total solids" refers to the sum of the silica and the alkali. The weight ratio is a most important silicate variable. Ratio determines the product solubility, reactivity and physical properties. Ratio is either the weight or molar proportion of silica to alkali. Density is an expression of total solids and is typically determined using a hydrometer. As temperatures increase, density decreases. When solids content increases, density increases. The pH is a function of silicate composition and solids concentration. The pH value of silicates does not truly reflect the alkali content of solution, due to the strong buffering capability of silica. This means the pH of a silicate solution is kept constant until almost completely neutralized. The buffering capacity of silicate solutions increases with increasing ratio of silica to alkali.

The filler may be a silicon dioxide powder such as Min-U-Sil (trademark) 5 silicon dioxide available from U.S. Silica (of Berkeley Springs, W. Va.). This silicon dioxide is fine ground silica. Chemical analysis of the Min-U-Sil (trademark) silicon dioxide indicates contents of 98.5% silicon dioxide, 0.060% iron oxide, 1.1% aluminum oxide, 0.02% titanium dioxide, 0.04% calcium oxide, 0.03% magnesium oxide, 0.03% sodium dioxide, 0.03% potassium oxide and a 0.4% loss on ignition. The typical physical properties are a compacted bulk density of 41 lbs/ft³, an uncompacted bulk density of 36 lbs/ft³, a hardness of 7 Mohs, hegman of 7.5, median diameter of 1.7 microns, an oil absorption (D-1483) of 44, a pH of 6.2, 97% −5 microns, 0.005%+325 Mesh, a reflectance of 92%, a 4.2 yellowness index and a specific gravity of 2.65.

Emittance agents are available from several sources. Emissivity is the relative power of a surface to emit heat by radiation, and the ratio of the radiant energy emitted by a surface to the radiant energy emitted by a blackbody at the same temperature. Emittance is the energy radiated by the surface of a body per unit area.

The boron carbide, also known as carbon tetraboride, which may be used as an emissivity agent in the present invention, is sold as 1000 W boron carbide and is available from Electro Abrasives (of Buffalo, N.Y.). Boron Carbide is one of the hardest man made materials available. Above 1300° C., it is even harder than diamond and cubic boron nitride. It has a four point flexural strength of 50,000–70,000 psi and a compressive strength of 414,000 psi, depending on density. Boron Carbide also has a low thermal conductivity (29–67 W/mK) and has electrical resistivity ranging from 0.1–10 ohm-cm. Typical chemical analysis indicates 77.5% boron, 21.5% carbon, iron 0.2% and total Boron plus Carbon is 98%. The hardness is 2800 Knoop and 9.6 Mohs, the melting point is 4262° F. (2350° C.), the oxidation temperature is 932° F. (500° C.), and the specific gravity is 2.52 g/cc.

1000 W green silicon abide (SiC), an optional emissivity agent, is also available from Electro Abrasives. Green Silicon Carbide is an extremely hard (Knoop 2600 or Mohs 9.4) man made mineral that possesses high thermal conductivity (100 W/m-K). It also has high strength at elevated temperatures (at 1100° C., Green SiC is 7.5 times stronger than $Al_2O_3$). Green SiC has a Modulus of Elasticity of 410 GPa, with no decrease in strength up to 1600° C., and it does not melt at normal pressures but instead dissociates at 2815.5° C. Green silicon carbide is a batch composition made from silica sand and coke, and is extremely pure. The physical properties are as follows for green silicon carbide: the hardness is 2600 Knoop and 9.4 Mohs, the melting point is 4712° F. (2600° C.), and the specific gravity is 3.2 g/cc. The typical chemical analysis is 99.5% SiC, 0.2% $SiO_2$, 0.03% total Si, 0.04% total Fe, and 0.1% total C. Commercial silicon carbide and molybdenum disilicide may need to be cleaned, as is well known in the art, to eliminate flammable gas generated during production. As used herein, the term "silicon carbide" refers to the powdered or granular form of silicon carbide.

Boron silicide ($B_6Si$) (Item# B-1089) is available from Cerac (of Milwaukee, Wis.). The boron silicide, also known as silicon hexaboride, available from Cerac has a −200 mesh (about 2 microns average) and a typical purity of about 98%. Zirconium boride ($ZrB_2$) (Item# Z-1031) is also available from Cerac with a typical average of 10 microns or less (−325 mesh), and a typical purity of about 99.5%. Iron oxide (SYN-OX HB-1033T) available from Hoover Color (of Hiwassee, Va.) is a synthetic black iron oxide ($Fe_2O_3$) which has an iron oxide content of 60%, a specific gravity of 4.8 gm/cc, a tap density (also known as, bulk density) of 1.3 gm/cc, oil absorption of 15 lbs/100 lbs, a 325 mesh residue of 0.005, and a pH ranging from 7 to 10.

Preferably the admixture of the present invention includes bentonite powder, tabular alumina, or magnesium alumina silica clay. The bentonite powder permits the present invention to be prepared and used at a later date. Preparations of the present invention without bentonite powder must be used immediately. The examples provided for the present invention include PolarGel bentonite powder (Item# 354) available from Whittaker Clark & Daniels (of South Plainfield, N.J.). Technical grade bentonite is generally used for the purpose of suspending, emulsifying and binding agents, and as Theological modifiers. The typical chemical analysis 59.00% to 61.00% of silicon dioxide ($SiO_2$), 20.00% to 22.00% of aluminum oxide ($Al_2O_3$), 2.00% to 3.00% calcium oxide (CaO), 3.50% to 4.30% magnesium oxide (MgO), 0.60% to 0.70% ferric oxide ($Fe_2O_3$), 3.50% to 4.00% sodium oxide ($Na_2O$), 0.02% to 0.03% potassium oxide ($K_2O$), and 0.10% to 0.20% titanium dioxide and a maximum of 8.0% moisture. The pH value ranges from 9.5 to 10.5. Typical physical properties are 83.0 to 87.0 dry brightness, 2.50 to 2.60 specific gravity, 20.82 pounds/solid gallon, 0.0480 gallons for one pound bulk, 24 ml minimum swelling power, maximum 2 ml gel formation, and 100.00% thru 200 mesh. Tabular alumina (Alumina Tab T64 Item 635) and magnesium alumina silica clay (Mag Alum Sil Technical Item 105) are also available from Whittaker Clark & Daniels.

Colorants, which may be added to the present invention, include but are not limited to inorganic pigments. Suitable inorganic pigments, such as yellow iron oxide, chromium oxide green, red iron oxide, black iron oxide, titanium dioxide, are available from Hoover Color Corporation. Additional suitable inorganic pigments, such as copper chromite black spinel, chromium green-black hematite, nickel antimony titanium yellow rutile, manganese antimony titanium buff rutile, and cobalt chromite blue-green spinel, are available from The Shepherd Color Company (of Cincinnati, Ohio).

The present invention is applied to a substrate surface. The substrate surface may be a metallic substrate such as iron, aluminum, alloys, steel, cast iron and the like. The coating is typically applied wet, and either allowed to air dry or heat dry. The metal substrates may be internal surfaces of furnaces, automotive parts, and any other substrate surfaces which may be subjected to high temperatures.

Initially, a metal surface must be cleaned of all dirt, loose material, surfactants, oils, and the like. The surface of a metallic substrate may be grit blasted with a silica sand coarse media or Black Beauty (trademark) slag as necessary to remove oxidation and other tough contaminants. Black Beauty is a registered trademark of Harsco Corporation. The method of grit blasting the metallic substrate is not limited to silica sand coarse media and the like, but encompasses any equivalent alternative method. An amorphous blasting media is preferred when using a silica-based blasting media. The surface should be thoroughly cleaned after grit blasting using an alkaline cleaner. Useful cleaners include simple green (trademark), zinc phosphate, alcohol, methyl ethyl ketone, and the like. Simple Green is a trademark of Sunshine Makers, Inc. of Huntington Harbor Calif. These cleaning compounds are compatible with most metals. Specific cleaners work better with certain alloys as indicated by cleaner manufacturers' instructions. Mixing and cleaning instructions provided with the cleaner should be strictly followed. Cleaner substrate surfaces result in increased adhesion of the protective coating.

Various cleaning methods are available to prepare the metal for coating. The metal may be initially submersed in solution at 140° F. for 15 to 30 minutes. The metal is then rinsed thoroughly with deionized water and small brush (i.e., Nylon). The metal is then placed back into the metal cleaning solution for 30 additional minutes. The metal is then air dried with forced air before applying the protective coating. Cleanliness should be checked by applying alcohol to a paper towel, and wiping the substrate surface. If any discoloration is noted on the paper towel, repeat the entire grit blasting/cleaning procedure. The metal surface should be room temperature and completely dry for application of the thermal protective coating of the present invention. If the metal surface is not dry, coated products may not dry uniformly and may cause cracking or peeling.

The thermal protective coating of the present invention is prepared by placing the liquid ingredients in a clean, relatively dry mixing container. While mixing, the remaining ingredients are added slowly to the mixture to prevent the powders from clumping and sticking to the side of the mixing container. The mixture is then mixed at high power for at least 20 minutes depending on the configuration of the mixer. Preferably, a high shear impeller blade is used wherein the mixing is performed at revolutions ranging from about 3000 rpm to about 5000 rpm. A ball milling or bead milling apparatus may be used in lieu of a conventional mixer having a blade.

The solids in the thermal protective coating admixture may settle during storage. Prior to use, the admixture may be thoroughly re-mixed to ensure settled solids and clumps are completely redispersed. For 500 ml containers and larger, use a flat high speed/high shear blade, attach the blade to a hand drill, drill press or mixer motor with chuck, and mix at high speed while moving the blade up and down inside the container to hit and break down settled clumps. To ensure complete dispersion, the admixture should be remixed for 10 to 15 minutes. Small containers can be shaken by hand for 5 minutes and stirred with a paint stick to ensure settled clumps are dispersed and homogeneous.

The coating should be applied to the metal substrate as soon as possible after drying is complete such that the surface remains as clean as possible and no oxidation of the cleaned metal surface occurs. The coating admixture can be applied using a spray gun. A high volume low pressure spray gun is a preferred method of applying the coating to a substrate. It is desirable to use 15 to 35 psi of clean oil free air and a 1 mm nozzle. The spray gun manufacturer should be consulted to determine the most acceptable gun/nozzle system for application of coatings to metal. Suitable methods for applying coatings to metal using high volume low pressure spray applications are known in the art of paints and coatings. The spray gun flow and air settings are set to achieve a uniform coverage at desired densities.

Controlling the coverage density of the product is desirable for an even coating that adheres to and protects the metal. Most metal substrates require an approximate coverage of 200 $ft^2$/gallon (or 0.50 $oz/ft^2$). If possible, the metal being sprayed should be rotated 90 degrees (at least once) during application in order to prevent striping and maintain even coverage. The dry coating should not be thicker than approximately 1 to 10 mils. Coatings thicker than this may peel and not perform as well. Some applications may require sintering.

Example 1 contains N grade Sodium Silicate 15.0% dry weight and 20.0% wet weight based on sodium silicate solids content of 37.45%, Min-U-Sil 5 $SiO_2$ powder 79.0% dry weight and 39.5% wet weight, 1000 W $B_4C$ 5.00% dry weight and 2.50% wet weight, PolarGel bentonite powder (Item# 354) 1.00% dry weight and 0.500% wet weight, and 37.5% water, based on sodium silicate solids content of 37.45%. The pH of example 1 is 11.2±1.0, the specific gravity is 1.45±0.05, and the total solids content is 50±0.3%.

Example 1 is prepared by placing the liquid ingredients in a clean, relatively dry mixing container. While mixing, the remaining ingredients are added slowly to the mixture to prevent the powders from clumping and sticking to the side of the mixing container. The mixture is then mixed at high power for at least 20 minutes depending on the configuration of the mixer. The mixing was carried out in a high shear mixer with a 2.5 inch Cowles Hi-Shear Impeller blade with a 0.5 horsepower motor generating 7500 rpm without load.

Example 2 contains N grade Sodium Silicate 15.0% dry weight and 20.0% wet weight based on sodium silicate solids content of 37.45%, min-U-Sil 5 $SiO_2$ powder 69.0% dry weight and 34.5% wet weight, 1000 W $B_4C$ 15.0% dry weight and 7.5% wet weight, PolarGel bentonite powder (Item# 354) 1.00% dry weight and 0.500% wet weight, and 37.5% water, based on sodium silicate solids content of 37.45%. The pH of example 2 is 11.2±1.0, the specific gravity is 1.45±0.05, and the total solids content is 50±0.3%. Example 2 is prepared in the same fashion as example 1. This embodiment is a preferred embodiment for sintering applications. It has a softening point ranging from about 700° C. to about 800° C.

Example 3 contains N grade Sodium Silicate 15.0% dry weight and 20.0% wet weight based on sodium silicate solids content of 37.45%, min-U-Sil 5 $SiO_2$ powder 79.0% dry weight and 39.5% wet weight, boron silicide 5.00% dry weight and 2.50% wet weight, PolarGel bentonite powder (Item# 354) 1.00% dry weight and 0.500% wet weight, and 37.5% water, based on sodium silicate solids content of 37.45%. The pH of example 3 is 11.2±1.0, the specific gravity is 1.45±0.05, and the total solids content is 50±0.3%. Example 3 is prepared in the same fashion as example 1.

Example 4 contains N grade Sodium Silicate 15.0% dry weight and 20.0% wet weight based on sodium silicate solids content of 37.45%, min-U-Sil 5 $SiO_2$ powder 79.0% dry weight and 39.5% wet weight, iron oxide 5.00% dry weight and 2.50% wet weight, PolarGel bentonite powder (Item# 354) 1.00% dry weight and 0.500% wet weight, and 37.5% water, based on sodium silicate solids content of 37.45%. The pH of example 4 is 11.2±1.0, the specific gravity is 1.45±0.05, and the total solids content is 50±0.3%. Example 4 is prepared in the same fashion as example 1.

There are many examples of applications on substrates. Applications wherein the substrate is metallic include applying the coating to a thin aluminum attached to insulating material such as a fibrous tile with a high content of $Al_2O_3$ or a woven ceramic blanket composed of Nextel 440 fabric or high content of $Al_2O_3$ has heightened protective abilities.

It is to be understood that the present invention is not limited to the embodiments described above, but encompasses any and all embodiments within the scope of the following claims.

What is claimed is:

1. A thermal protective coating, comprising:
   in dry admixture,
   a. from about 5% to about 30% of an alkali/alkaline earth metal silicate taken from the group consisting of sodium silicate, potassium silicate, calcium silicate, and magnesium silicate;
   b. from about 45% to about 92% of a filler taken from the group consisting of silicon dioxide, aluminum oxide, titanium dioxide, magnesium oxide, calcium oxide, and boron oxide; and
   c. from about 2% to about 20% of one or more emissivity agents taken from the group consisting of silicon hexaboride, boron carbide, silicon tetraboride, silicon carbide powder, molybdenum disilicide, tungsten disilicide, zirconium diboride, cupric chromite, and metallic oxides;
   d. wherein the coating is essentially phosphate free.

2. The coating of claim 1, further comprising:
   a. from about 1% to about 5% of a stabilizer taken from the group consisting of bentonite, kaolin, magnesium alumina silica clay, tabular alumina, and stabilized zirconium oxide.

3. The coating of claim 1, wherein:
   a. the emissivity agents is a metallic oxide taken from the group consisting of iron oxide, magnesium oxide, manganese oxide, chromium oxide, and derivatives thereof.

4. The coating of claim 1, further comprising:
   a. water forming a wet admixture having a total solids content ranges from about 40% to about 60%.

5. The coating of claim 2, further comprising:
   a water forming a wet admixture having a total solids content ranges from about 40% to about 60%.

6. A thermal protective coating, comprising:
   in dry admixture
   a. from about 10% to about 20% sodium silicate,
   b. from about 50% to about 79% silicon dioxide powder, and
   c. from about 4% to about 15% of one or more emissivity agents taken from the group consisting of iron oxide, boron silicide, boron carbide, silicon tetraboride, silicon carbide powder, molybdenum disilicide, tungsten disilicide, and zirconium diboride.

7. The coating of claim 6, further comprising:
   a. from about 1% to about 5% of a stabilizer taken from the group consisting of bentonite, kaolin, magnesium alumina silica clay, tabular alumina, and stabilized zirconium oxide.

8. The coating of claim 7, wherein:
   a. the stabilizer is bentonite powder.

9. The coating of claim 8, further comprising:
   water forming a wet admixture having a total solids content ranges from about 40% to about 60%.

10. A thermal protective coating consisting essentially of:
    in dry admixture,
    a. from about 5% to about 30% of an inorganic adhesive,
    b. from about 45% to about 92% of a filler, and
    c. from about 2% to about 20% of one or more emissivity agents taken from the group consisting of silicon hexaboride, boron carbide, silicon tetraboride, silicon carbide powder, molybdenum disilicide, tungsten disilicide, zirconium diboride, cupric chromite, and metallic oxides.

11. The coating of claim 10, further comprising:
    a. from about 1% to about 5% of a stabilizer.

12. The coating of claim 10, wherein:
    a. the emissivity agent is a metallic oxide taken from the group consisting of iron oxide, magnesium oxide, manganese oxide, chromium oxide, copper chromium oxide, and derivatives thereof.

13. The coating of claim 10, further comprising:
    a. water forming a wet admixture having a total solids content ranges from about 40% to about 60%.

14. The coating of claim 11, further comprising:
    a. water forming a wet admixture having a total solids content ranging from about 40% to about 60%.

15. The coating of claim 10, wherein:
    from about 4% to about 15% of the emissivity agent is present in the dry admixture.

16. The coating of claim 15, wherein:
the emissivity agent is taken from the group consisting of iron oxide, boron silicide, and boron carbide.

17. The coating of claim 10, wherein:
a. the inorganic adhesive is an alkali/alkaline earth metal silicate taken from the group consisting of sodium silicate, potassium silicate, calcium silicate, and magnesium silicate.

18. The coating of claim 10, wherein:
a. the filler is a metal oxide taken from the group consisting of silicon dioxide, aluminum oxide, titanium dioxide, magnesium oxide, calcium oxide, and boron oxide.

19. The coating of claim 10, further comprising:
a. a colorant.

20. The coating of claim 1, wherein:
a. the stabilizer is taken from the group consisting of bentonite, kaolin, magnesium alumina silica clay, tabular alumina, and stabilized zirconium oxide.

21. A method of preparing a protective thermal coating for a substrate, comprising the steps of:
a. adding a dry admixture to a mixing container wherein the dry admixture contains
  i. from about 5% to about 30% of an inorganic adhesive,
  ii. from about 45% to about 92% of a filler, and
  iii. from about 2% to about 20% of one or more emissivity agents taken from the group consisting of silicon hexaboride, boron carbide, silicon tetraboride, silicon carbide powder, molybdenum disilicide, tungsten disilicide, zirconium diboride, cupric chromite, and metallic oxides;
  iv. wherein the admixture is essentially phosphate free;
b. adding water to the mixing container so that total solids content of wet admixture ranges from about 40% to about 60%; and
c. mixing the contents of the mixing container thereby forming a protective thermal coating solution.

22. The method of claim 21, wherein:
a. the dry admixture further comprises a stability agent.

23. The method of claim 21, wherein:
a. the inorganic adhesive is an alkali/alkaline earth metal silicate taken from the group consisting of sodium silicate, potassium silicate, calcium silicate, and magnesium silicate.

24. The method of claim 21, wherein
a. the filler is taken from the group consisting of silicon dioxide, aluminum oxide, titanium dioxide, magnesium oxide, calcium oxide, and boron oxide.

25. The method of claim 21, wherein:
a. the dry admixture further comprises from about 1% to about 5% of a stabilizer taken from the group consisting of bentonite, kaolin, magnesium alumina silica clay, tabular alumina, and stabilized zirconium oxide.

26. The method of claim 21, wherein:
a. the emissivity agent is a metallic oxide taken from the group consisting of iron oxide, magnesium oxide, manganese oxide, chromium oxide, copper chromium oxide, and derivatives thereof.

27. The method of claim 21, further comprising the steps of:
a. placing liquid ingredients in the mixing container prior to mixing in dry ingredients.

28. The method of claim 21, further comprising the steps of:
a. mixing at high shear until the contents are well dispersed.

29. The method of claim 21, further comprising the steps of:
a. providing a storage container, and
b. placing the thermal protective coating solution in the storage container for future use.

30. The method of claim 29, further comprising the steps of:
a. remixing the thermal protective coating solution in the storage container after storage for current use.

31. The method of claim 21, further comprising the steps of:
a. coating a substrate with the thermal protective coating solution.

32. The method of claim 30, further comprising the steps of:
a. coating a substrate with the thermal protective coating solution.

33. The method of claim 21, further comprising the steps of:
a sintering the coating onto the substrate.

34. The method of claim 21, wherein:
a. the dry admixture further comprises a colorant.

35. A substrate coated with a thermal protective coating, comprising:
a. a substrate having a thermal protective coating thereon; and
b. the thermal protective coating containing
  i. from about 5% to about 30% of an inorganic adhesive,
  ii. from about 45% to about 92% of a filler, and
  iii. from about 2% to about 20% of one or more emissivity agents taken from the group consisting of silicon hexaboride, boron carbide, silicon tetraboride, silicon carbide powder, molybdenum disilicide, tungsten disilicide, zirconium diboride, cupric chromite, and metallic oxides,
  iv. wherein the coating is essentially phosphate free.

36. The coated substrate of claim 35, further comprising:
a. from about 1% to about 5% of a stabilizer taken from the group consisting of bentonite, kaolin, magnesium alumina silica clay, tabular alumina, and stabilized zirconium oxide.

37. The coated substrate of claim 35, wherein:
a. the inorganic adhesive is an alkali/alkaline earth metal silicate taken from the group consisting of sodium silicate, potassium silicate, calcium silicate, and magnesium silicate.

38. The coated substrate of claim 35, wherein
a. the filler is taken from the group consisting of silicon dioxide, aluminum oxide, titanium dioxide, magnesium oxide, calcium oxide, and boron oxide.

39. The coated substrate of claim 35 wherein:
a. the emissivity agent is a metallic oxide taken from the group consisting of iron oxide, magnesium oxide, manganese oxide, chromium oxide, copper chromium oxide, and derivatives thereof.

40. The coated substrate of claim 35, further comprising:
a. a colorant.

* * * * *